US005896505A

United States Patent [19]
Shimazaki

[11] Patent Number: 5,896,505
[45] Date of Patent: *Apr. 20, 1999

[54] DATA TRANSFER SYSTEM AND METHOD FOR DIVIDING AN ORIGINAL DATA READ INSTRUCTION INTO INDIVIDUAL READ DEMANDS FOR EACH DATA ELEMENT

[75] Inventor: Masashi Shimazaki, Yamanashi, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/448,862

[22] Filed: May 24, 1995

[30] Foreign Application Priority Data

May 25, 1994 [JP] Japan .................................. 6-110836

[51] Int. Cl.$^6$ .................................................. G06F 13/364
[52] U.S. Cl. .......................... 395/200.43; 395/200.42; 395/200.62; 395/827; 395/841
[58] Field of Search ........................ 395/375, 200.17, 395/827, 841, 200.43, 200.42, 200.46, 200.62; 364/514

[56] References Cited

U.S. PATENT DOCUMENTS

| | | | |
|---|---|---|---|
| 3,704,453 | 11/1972 | Blackwell et al. | 395/841 |
| 4,718,006 | 1/1988 | Nishida | 364/200 |
| 5,086,498 | 2/1992 | Tanaka et al. | 395/200.17 |
| 5,268,846 | 12/1993 | Bonsall et al. | 364/514 A |
| 5,539,914 | 7/1996 | Fry et al. | 395/827 |

FOREIGN PATENT DOCUMENTS 0 436 092  11/1990  European Pat. Off. .

OTHER PUBLICATIONS

Sainrat et al. (The design of the M3S: a muliported shared-memory multiprocessor) IEEE pp. 326–335. Nov., 1992.
"Vector Extensions to the VAX Architecture" COMPCOM 90, 35th IEEE COMPUTER SOCIETY CONF.; Dileep Bhandarkar; Feb. 26, 1990, through Mar. 2, 1990; San Francisco, CA; 120–126.
"The Design of the M3S: a Multiported Shared–Memory Multiprocessor"; Proceedings Of Supercomputing '92.; P. Sainrat; Nov. 16–22, 1992, Minneapolis MN; pp. 326–335.

Primary Examiner—Thomas C. Lee
Assistant Examiner—Gautam R. Patel
Attorney, Agent, or Firm—Foley & Lardner

[57] ABSTRACT

A data transfer system in an information processing system includes a plurality of storage devices and a plurality of information processing portions connected to the storage devices. The information processing portion includes a divided instruction issuing portion for dividing an instruction, for reading out a plurality of element data from the storage device into a plurality of read out demands per respective element data and issuing the read out demands to the storage device with adding an additional information of data identifying an original instruction and data indicative of issuance order. The storage device including a read out data returns portion returning the read out element data to one of the information processing portion which issued the element read out demand by adding the additional information to the data read out according to each of the element read out demands.

11 Claims, 13 Drawing Sheets

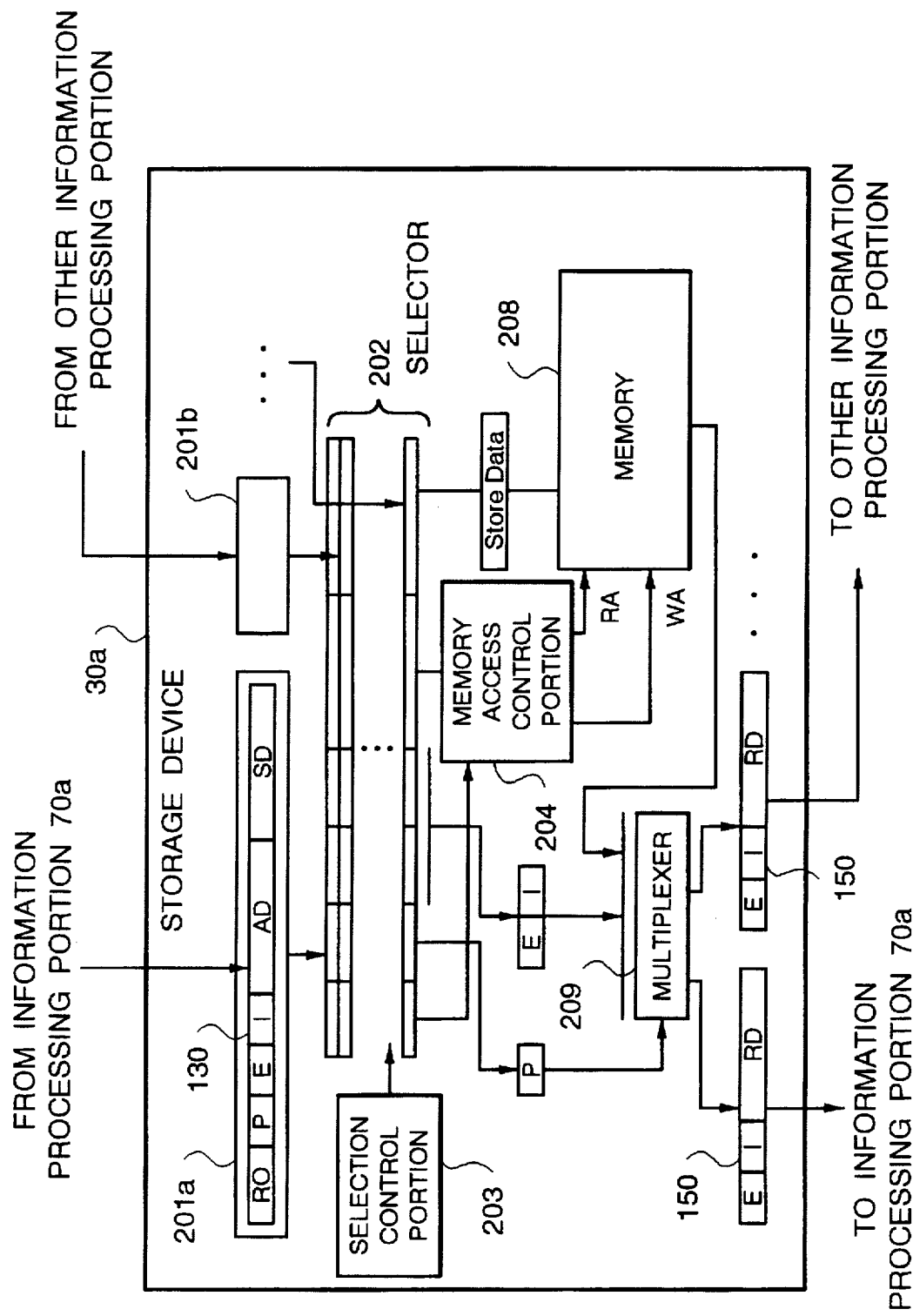

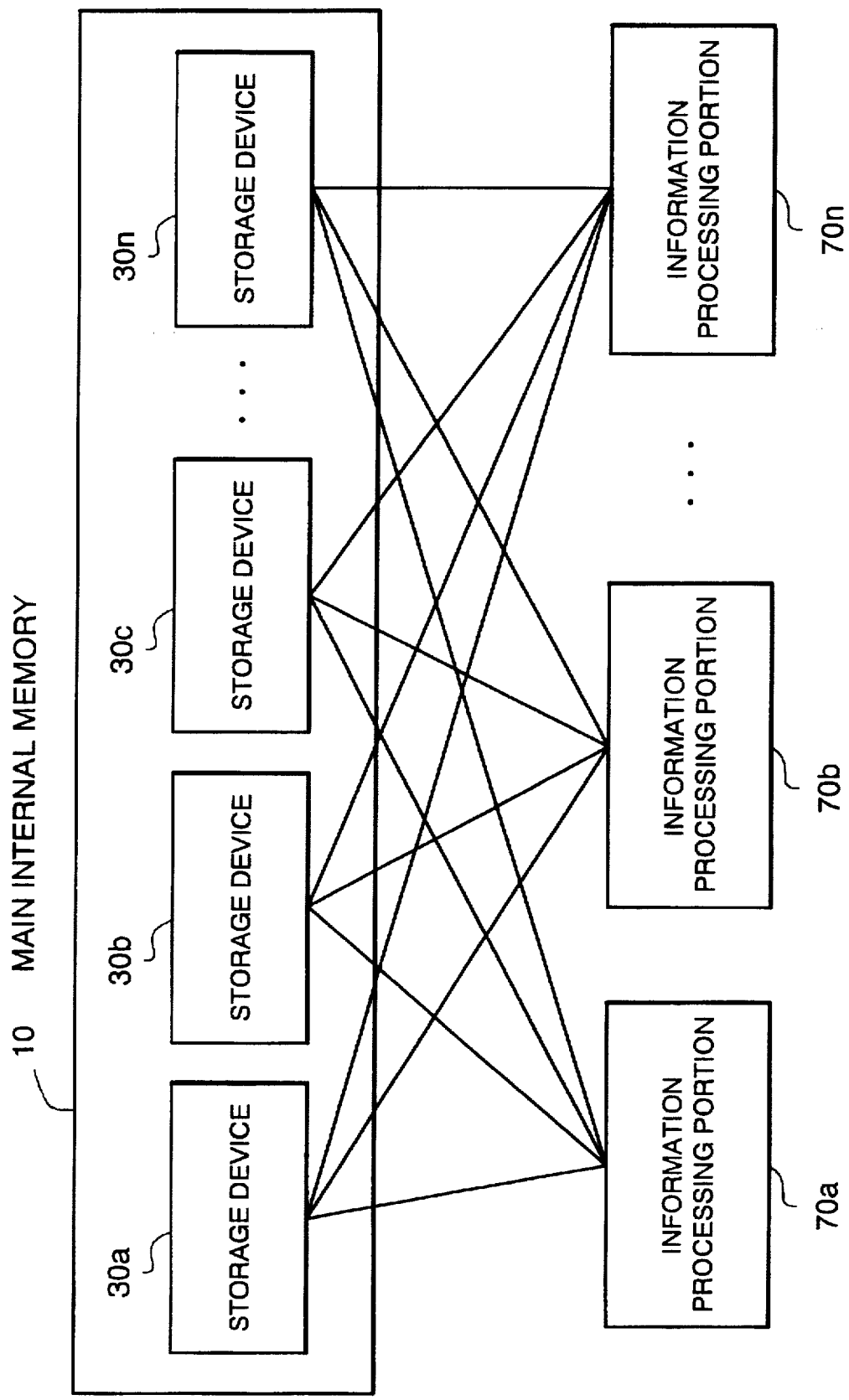

DATA TRANSFER SYSTEM AND METHOD FOR DIVIDING AN ORIGINAL DATA READ INSTRUCTION INTO INDIVIDUAL READ DEMANDS FOR EACH DATA ELEMENT

BACKGROUND OF THE INVENTION

1. Field of the Invention

The present invention relates generally to a data transfer system in an information processing system, such as a multi-processor system and so forth. More specifically, the invention relates to a data transfer system for transferring a set of data between a main internal memory according to a vector instruction, such as vector load, vector store and so forth, in an information processing system having the main internal memory constituted of a plurality of storage devices to be accessed by a plurality of information processing portions.

2. Description of the Related Art

Conventionally, when instructions for reading out a set of data from the main internal memory, such as a vector load instruction of a vector instruction in a multi-processor system including a main internal memory constituted of a plurality of storage devices and a plurality of information processing portions accessing the main internal memory, are issued from the information processing portions to the main internal memory without any constraint, it is possible to cause overlapping of addresses of data to be read out from the main internal memory at a certain vector length (number of element data) or element distance (an interval of element data to be loaded) designated by the vector instructions issued from respective information processing portions. In such case, a plurality of vector load instructions, issued from respective information processing portions, access the same storage device in the main internal memory and cause conflict.

Upon occurrence of conflict in accessing of the same storage device, since it is not possible to perform a read operation from the same storage device by two or more vector load instructions, a later vector load instruction cannot be executed until completion of the reading process by the preceding vector load instruction. This is one of the causes of prolongation of reading data to be transferred to the information processing portions from the storage device.

On the other hand, the read out data from the storage device, on which no conflict is caused, may return to the information processing portion at an earlier timing than the data should have been read out by the vector load instruction which is situated in waiting due to occurrence of conflict. Therefore, when the leading vector load instruction causes conflict and the trailing vector load instruction does not cause conflict, reversal of order of the read out data returned to the information processing portion from the order issuing the load command.

Therefore, in the prior art, in order to ascertain orderliness and sequentiality of the read out data, it is typical to take a measure to provide a data control device for concentrically controlling read out demand from respective information processing portions as shown in FIG. 10, or to provide an issuance control portion to enable to mutually notify the load demand issuance timing and read out completion timing between respective information processing portions and thus to control issuance of the vector load instructions so that two or more information processing portions will never access the same storage device simultaneously, as shown FIG. 11.

In FIG. 10, the vector load instructions from respective information processing portions 700a to 700n are issued to a data control portion 800 at any time as required. The data control portion 800 which received the vector load instruction includes a priority circuit for determining a priority order for the information processing portions for preferentially handling the vector load instructions according to the priority order. According to the determined priority order, the element data from memories of respective storage devices 600a to 600n of the main internal memory 500 are read out. The data control device 800 verifies that the data sequence read out from respective storage devices 600a to 600n is in correct order. Also, upon verification that all element data is obtained, the read out data is sequentially transferred to the information processing portion which issued the vector load instruction.

In the data transfer system illustrated in FIG. 10, when access to the main internal memory according to the vector load instruction from the information processing portion is initiated, access to the main internal memory according to the vector load instruction from other information processing portion will never be executed until the reading out process according to the currently executed instruction is completed.

A timing chart in FIG. 12 shows an operation when the vector load instructions are issued simultaneously to the data control portion 800 from four information processing portions A, B, C and D, as one example of operation of the system of FIG. 10. Assuming that priority order is given by the priority circuit in the data control portion 800 for reading out in the order of A, B, C, D, reading according to the vector load instruction from the information processing portion B is initiated after completion of reading according to the vector load instruction from the information processing portion A. Similarly, reading according to the vector load instruction from the information processing portion C is initiated after completion of reading according to the vector load instruction from the information processing portion B, and reading according to the vector load instruction from the information processing portion D is initiated after completion of reading according to the vector load instruction from the information processing portion C.

On the other hand, in place of the data control device 800 shown in FIG. 10, a reading out demand issuance control portion 900 is provided for each information processing portion in FIG. 11 so that the vector load instruction issuing timing and reading out completion timing are mutually notified between the information processing portions and access is controlled for avoiding simultaneous access to the main internal memory from two or more information processing portions. Each reading out demand issuance control portion 900 of each of the information processing portions 700a to 700n has a priority circuit determining the priority order for respective information processing portions for preferentially handling the vector load instructions according to the priority order. According to the determined priority order, the element data is read out from the main internal memory. At first, to all of the information processing portions 700a to 700n, vector load instruction issuance timing is notified. Each information processing portion obtaining priority right, by checking its own priority order, initiates access to the main internal memory 500. Then, a timing, at which all of the read out data is stored in each information processing portion is predicted, and the read out completion timing is notified to the respective information processing portions.

In the read out demand issuance control portion 900 in each information processing portion, subsequent reading out is managed so that subsequent reading is performed sequentially. Even in this data transfer system, similarly to the data transfer system of FIG. 10, when access to the main internal memory according to the read out demand from certain information processing portion is initiated, access to the main internal memory according to the read out demand from other information processing portions is never executed until the on-going reading out process is completed.

A timing chart of FIG. 13 shows an operation when the vector load instructions are issued simultaneously to the read out demand issuance control portion 900 from four information processing portions A, B, C and D, as one example of operation of the system of FIG. 11. At first, the read out demand issuance timing and own information processing portion number are notified from the information processing portion A to remaining, information processing portions B, C, D. Similarly, the read out demand issuance timing and own information processing portion number are notified from the information processing portion B to remaining information processing portions A, C, D, the read out demand issuance timing and own information processing portion number are notified from the information processing portion C to remaining information processing portions A, B, D, and the read out demand issuance timing and own information processing portion number are notified from the information processing portion D to remaining information processing portions A, B, C.

It is assumed that the information processing portions receiving the read out demand issuance timing perform reading in the order of A, B, C, D according to the priority order determined by the priority circuit in the read out demand issuance control portion 900. Thereafter the reading out process according to the reading out demand from the information processing portion A is initiated. At the timing of completion of reading out process, the information processing portion A issues notification to other information processing portions. The information processing portion B is responsive to the read out completion timing signal from the information processing portion A to manage issuance of the read out demand by the read out demand issuance control portion 900 so that reading out from the main internal memory is performed sequentially. Simultaneously with completion of reading out of the information processing portion A, reading out according to the read out demand from the information processing portion B is initiated. Similarly, reading out is performed sequentially in the B, C, D in order.

Such conventional data transfer system, the possibility to be kept in waiting is increased in proportion to number of the information processing portions. Also, even when the main internal memory is divided into a plurality of storage devices according to the addresses, it is still not possible to read out data from the same storage device simultaneously in parallel by a plurality of information processing portions, in practical operation. In other words, the storage device which is utilized by one information processing portion cannot be accessed by other information processing portion. Therefore, merit of the multi-processor construction cannot be completely utilized.

It should be noted that the conventional data transfer system has been disclosed in U.S. Pat. No. 4,718,006.

SUMMARY OF THE INVENTION

Therefore, it is an object of the present invention to provide a data transfer system in an information processing system which permits parallel access of a common storage device from a plurality of information processing portions.

Another object of the present invention is to provide a data transfer system in an information processing system which can store read out data in correct order even when disorder of read out data is caused by reversal of order between a plurality of read out element data returned to the information processing portion due to conflict of access for accessing the same storage device.

In order to accomplish the above-mentioned and other objects, according to the first aspect of the invention, a data transfer system in an information processing system including a plurality of storage means and a plurality of information processing means connected to the storage means, comprises:

the information processing means including a divided instruction issuing means for dividing an instruction, for reading out a plurality of element data from the storage means, into a plurality of read out demands per respective element data and for issuing a read out demand to the storage means with adding an additional information of data identifying an original instruction and data indicative of issuance order; and the storage means including a read out data returning means for returning the read out element data to one of the information processing means which issued the element read out demand by adding the additional information to the data read out according to each of the element read out demands.

In the preferred construction, the information processing means include register means for storing the read out element data returned from the storage means, in a correct order on the basis of the additional information. The divided instruction issuing means may issue each of the element read out demands to the storage means on a distributed basis defined by the address of read out element data.

Each of the element read out demands may be consisted of a demand source data identifying the information processing means as source of the demand, an order data indicative of issuance order in which the read out demand of each element data is issued, a discrimination data for discriminating an instruction of a dividing source, and a memory address in the storage means of each element data.

The storage means may return the additional information corresponding to the read out data, read out according to the element read out demand, in advance of the read out data for a period corresponding to a period required for the reading out process of the read out data. The storage means may also include selection control means for selecting one of a plurality of element read out demands when a plurality of element read out demands from the information processing means causes conflict.

According to the second aspect of the invention, a data transfer system in an information processing system including a plurality of storage means and a plurality of information processing means connected to the storage means, comprises:

the information processing means including
a divided instruction issuing means for dividing an instruction, for reading out a plurality of element data from the storage means, into a plurality of read out demands per respective element data and for issuing a read out demand to the storage means with adding an additional information of data identifying an original instruction and data indicative of issuance order; and register means for storing the read out element data returned from the storage means, in a correct order on the basis of the additional information; and the storage means including
- a read out data returning means for returning the read out element data to one of the information processing means which issued the element read out demand by adding the additional information to the data read out according to each of the element read out demands,
- the divided instruction issuing means issuing each of the element read out demands to the storage means on a distributed basis defined by the address of read out element data, and
- each of the element read out demands being consisted of a demand source data identifying the information processing means as source of the demand, a order data indicative of issuance order in which the read out demand of each element data is issued, a discrimination data for discriminating an instruction of a dividing source, and a memory address in the storage means of each element data.

According to the third aspect of the invention, a method for transferring data in an information processing system including a plurality of storage means and a plurality of information processing means connected to the storage means, comprises the steps of:

- dividing an instruction, for reading out a plurality of element data from the storage means, into a plurality of read out demands per respective element data and issuing a read out demand to the storage means with adding an additional information of data identifying an original instruction and data indicative of issuance order, by the information processing means;
- returning the read out element data to one of the information processing means which issued the element read out demand by adding the additional information to the data read out according to each of the element read out demands, by the storage means; and
- storing the read out element data returned from the storage means, in a correct order on the basis of the additional information, in the information processing means.

Each of the element read out demands may be issued to the storage means on a distributed basis identified by an address of the read out element data.

The additional information corresponding to the read out data, read out according to the element read out demand, may be returned in advance of the read out data for a period corresponding to a period required for the reading out process of the read out data.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 1B is a block diagram showing a detailed construction of a storage device, for which the preferred embodiment of a data transfer system according to the present invention is applied;

FIG. 2 is a block diagram showing an overall construction of the multi-processor system as an information processing system, in accordance with the preferred embodiment of the data transfer system according to the invention;

DESCRIPTION OF THE PREFERRED EMBODIMENT

The preferred embodiment of a data transfer system in an information processing system according to the present invention will be discussed with reference to the accompanying drawings. In the following description, numerous specific details are set forth in order to provide a thorough understanding of the present invention. It will be obvious, however, to those skilled in the art that the present invention may be practiced without these specific details. In other instances, wellknown structures are not shown in detail in order to unnecessary obscure the present invention.

FIG. 2 shows overall construction of a multi-processing system as an information processing system, for which the present invention is applied. The multi-processor system includes a main internal memory 10 divided into a plurality of storage devices 30a to 30n, and a plurality of information processing portions 70a to 70n which perform access with respect to respective storage devices 30a to 30n.

Figure 1A:
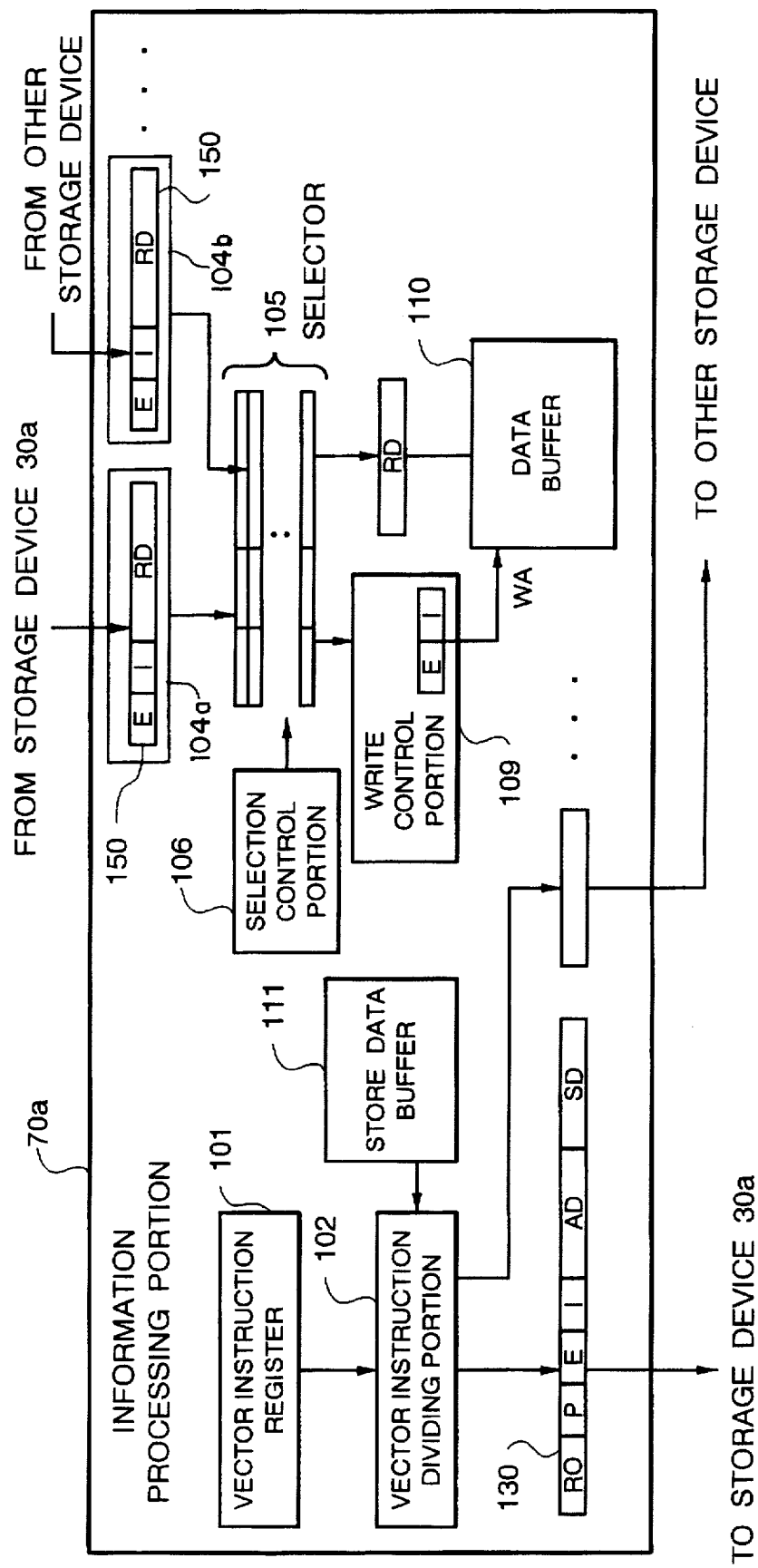
FIG. 1A is a block diagram showing a detailed construction of an information processing portion, for which the preferred embodiment of a data transfer system according to the present invention is applied.

FIG. 1A shows detailed construction of the information processing portion 70a to which the preferred embodiment of a data transfer system according to the present invention is applied. FIG. 1B shows detailed construction of the storage device 30a, to which the preferred embodiment of a data transfer system according to the present invention is applied. It should be noted that, in FIG. 1A and FIG. 1B, constructions of a plurality of the storage devices 30a to 30n and a plurality of the information processing portions 70a to 70n are identical, respectively. Therefore, only constructions of the storage device 30a and the information processing portion 70a are shown, and construction of other storage devices and other information processing portions are neglected from illustration.

The information processing portion 70a has a vector instruction register 101, a vector instruction dividing portion 102, a plurality of data registers 104a to 104n, a selector 105, a selection control portion 106, a write control portion 109 and a data buffer 110.

The vector instruction register 101 stores a vector instruction for performing vector load or vector store. The vector instruction dividing portion 102 generates and outputs a plurality of element access instructions 130a to 130n for reading or writing a plurality of element data by dividing a vector instruction which accesses a plurality of element data for reading or writing.

The data registers 104a to 104n store return data formulated by combination of the read out data read from the storage devices 30a to 30n and additional data on the basis of the element access instructions.

The selector 105 selectively reads out the return data of the data registers 104a to 104n. Also, the selection control portion 106 controls selection of the return data by the selector 105.

The write control portion 109 writes the read out element data of the return data selected by the selector 105 to the data buffer 108 on the basis of the additional data.

Referring to FIG. 1B, the storage device 30a includes a plurality of element access instruction registers 201a to 201n, a selector 202, a selection control portion 203, a memory access control portion 204, a memory 208 for storing the element data, and a multiplexer 209.

The element access instruction registers 201a to 201n store the element access instructions issued and transferred from the information processing portions 70a to 70n.

The selector 202 selectively reads out the element access instruction from the element access instruction registers 201a to 201n. Also, the selection control portion 203 controls selection of the element access instruction by the selector 202.

The memory access control portion 204 performs access for the memory 208 according to a memory address designated on the basis of the element access instruction. Namely, the memory access control portion 204 performs reading of the element data and writing thereof.

The multiplexer 209 generates a return data by combining an additional data including an instruction discrimination data and an issuance order data of the element access instruction, and provides the return data to the information processing portions 70a to 70n designated by the information processing portion number of the element access instruction.

Figure 3:
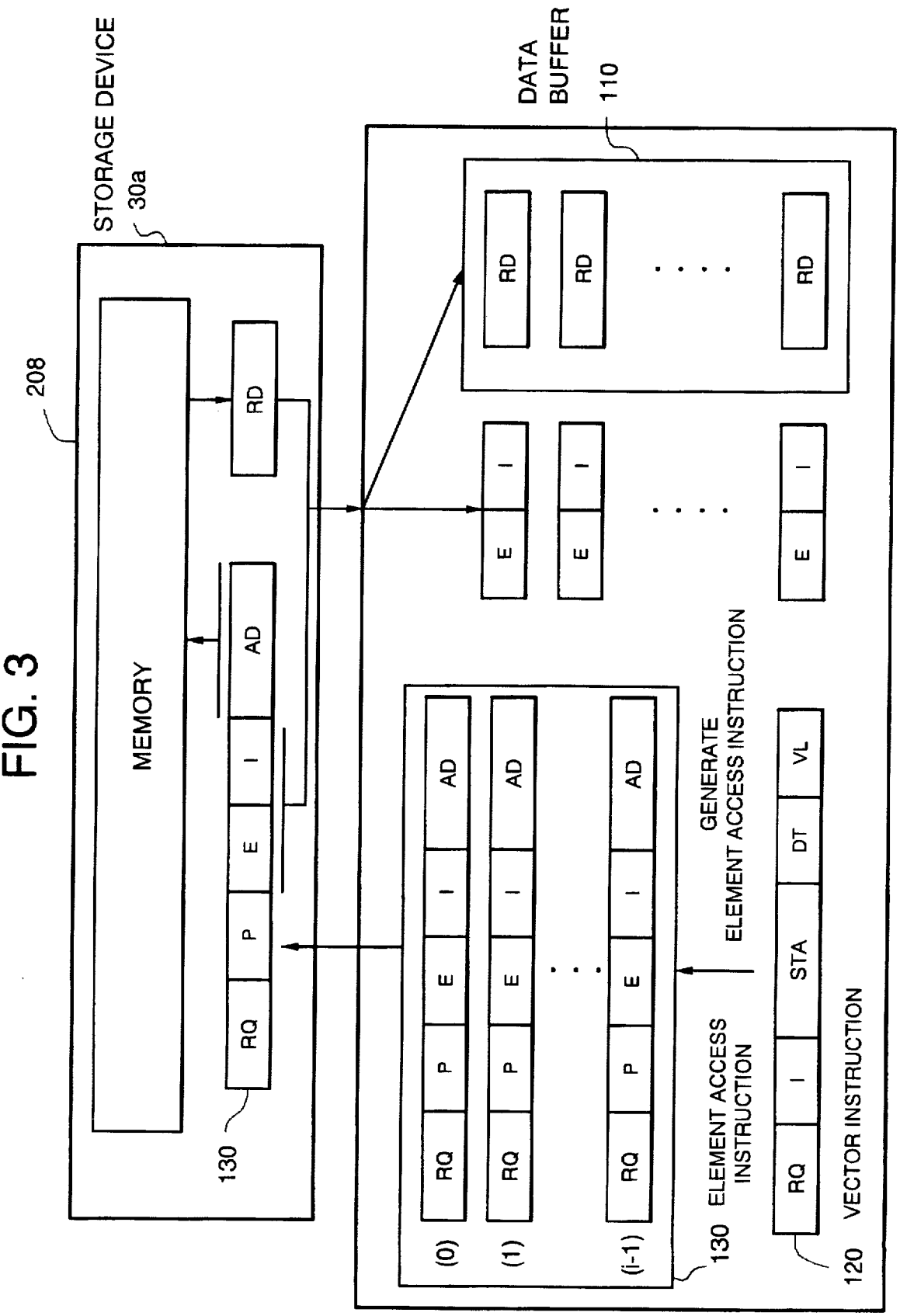
FIG. 3 is an explanatory illustration for facilitating understanding of flow of an element access instruction and a read out element data.

Referring to FIG. 3, a vector instruction 120 to be stored in the vector instruction register 101 of each of the information processing portions 70a to 70n includes, for example, an instruction kind data RQ, the instruction discrimination data I, a start address STA, an element data distance DT, and a vector length VL.

The instruction kind data RQ designates a kind of operation, i.e. vector load or vector store. The instruction discrimination data designates data for discriminating the vector instruction from other vector instructions.

The start address STA designates an address for starting reading or writing from and to the memory 208 of the storage devices 30a to 30n according to the vector load or vector store.

The element data distance DT designates an interval between element data upon reading of the element data or writing the same with respect to the memory 208 of the storage device 30a to 30n. Namely, per every element data distance, the element data distance is designated by a number of element data to be skipped from reading or writing. For instance, when the element is a word unit, the element data distance is designated by a word number.

The vector length VL is designated as one set of element data quantity to be read out or written in by one vector instruction.

In the shown embodiment of the information processing portions 70a to 70n, the vector instruction 120, such as vector load instruction or vector store instruction for accessing each of the storage devices 30a to 30n of the main internal memory 10 with respect to a set of element data, is divided per every element data to issue a plurality of element access instructions 130.

When the vector 120 instruction is the vector load instruction, the divided element access instructions 130 includes an instruction kind RQ, an information processing portion number P identifying one of the information processing portions 70a to 70n which issued the currently processed element load instruction 130, an issuance order E indicative [of] an order of occurrence of the element load instruction, an instruction discrimination data I for identifying the vector instruction 120 divided into the element load instruction 130, and a memory address AD of the element data to be read out.

When the vector instruction 120 is the vector store instruction, the element access instruction 130 also include the element data SD to be written to memory.

Figure 4:
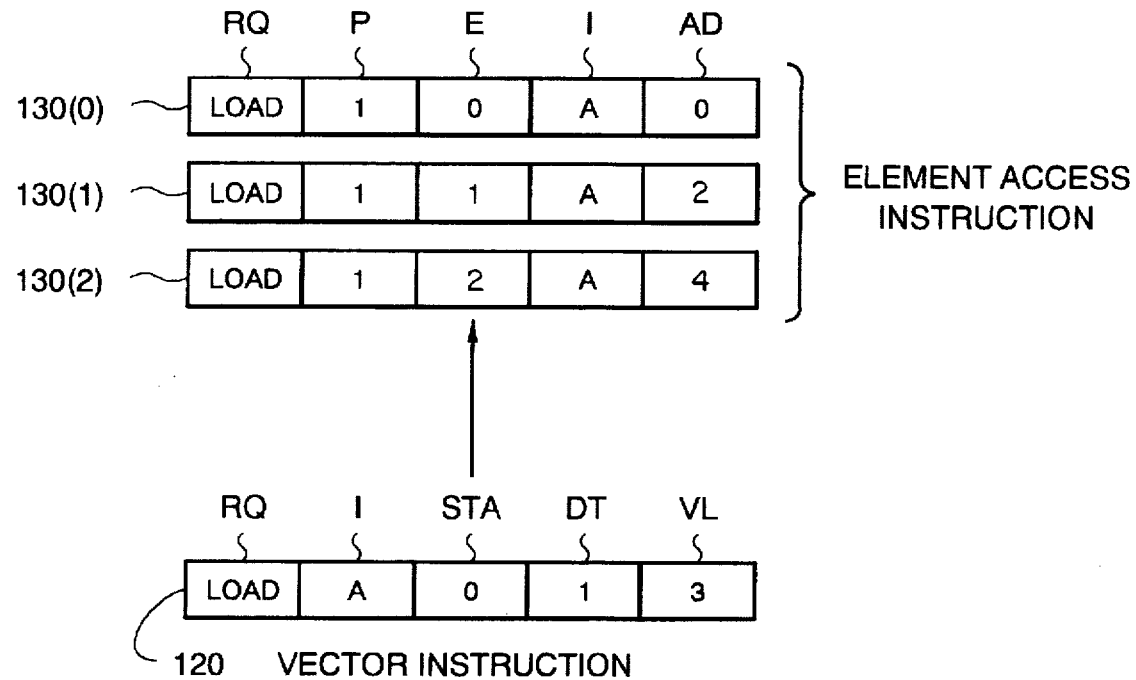
FIG. 4 is an illustration showing a concrete example, in which a vector instruction is divided into a plurality of demand access instructions.
Figure 5:
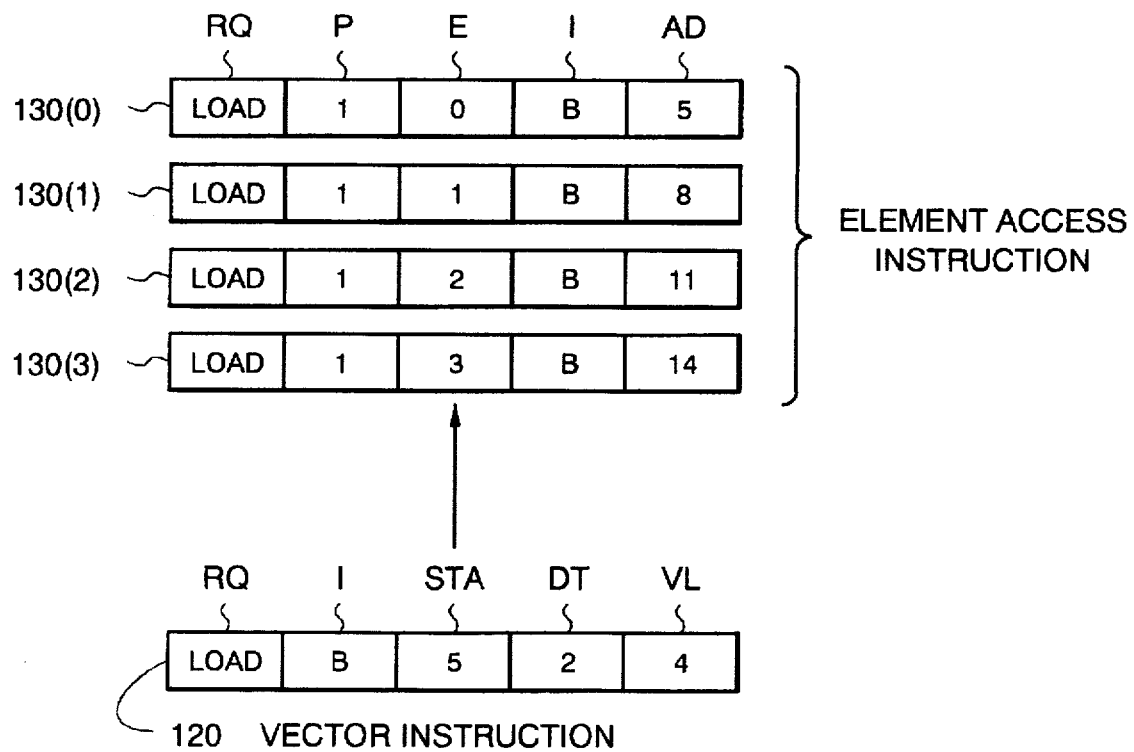
FIG. 5 is an illustration showing another concrete example, in which a vector instruction is divided into a plurality of demand access instructions.

FIGS. 4 and 5 show examples of the vector instruction 120 and the element access instruction 130. In case of the example of FIG. 4, the vector instruction 120 containing the instruction kind RQ is "load", the instruction discrimination data I is "A", the start address STA is "0", the element data distance DT is "1 (word)", the vector length VL is "3 (word)", is divided into three access instructions 130(0) to 130(2) per every element data. As shown, in the instruction kind RQ of respective element access instructions 130(0) to 130(2), "load" is designated. In the information processing portion number P, the number "1" of the information processing portion is designated. In the issuance order E, "0", "1", "2" are designated in order. In the instruction discrimination I, "A" is designated. In the memory address AD, with one word distance from the start address "0", "0", "2", "4" are designated.

In the example of FIG. 5, the vector instruction 120 containing the instruction kind RQ is "load", the instruction discrimination data I is "B", the start address STA is "5", the element data distance DT is "2 (word)", the vector length VL is "4 (word)", is divided into four access instructions 130(0) to 130(3) per every element data. As shown, in the instruction kind RQ of respective element access instructions 130(0) to 130(3), "load" is designated. In the information processing portion number P, the number "1" of the information processing portion is designated. In the issuance order E, "0", "1", "2", "3" are designated in order. In the instruction discrimination I, "B" is designated. In the memory address AD, with two words distance from the start address "5", "5", "8", "11", "14" are designated.

The element access instructions 130 issued by the information processing portions 70a to 70n for every element data are fed to the storage devices 30a to 30n and stored in the element access instruction registers 201a to 201n.

When the stored element access instructions are load instructions, the issuance order E and the instruction discrimination I are read out from the selector 202 and combined with the element data RD in the multiplexer 209. By this, the return data 150 is derived by combination of the issuance order E, the instruction discrimination I and the read out element data RD. The return data 150 is returned to one of the information processing portions 70a to 70n which issued the element access instructions 130 on the basis of the information processing number P of the element access instructions 130. In one of the information processing portions 70a to 70n, the return data 150 is received and stored in one of the data registers 104a to 104n.

Next, data transfer operation in the shown embodiment will be discussed with reference to FIGS. 3 to 7. FIG. 3 is an illustration showing an element access instruction and the flow of the read out element data for facilitating understanding.

Figure 6:
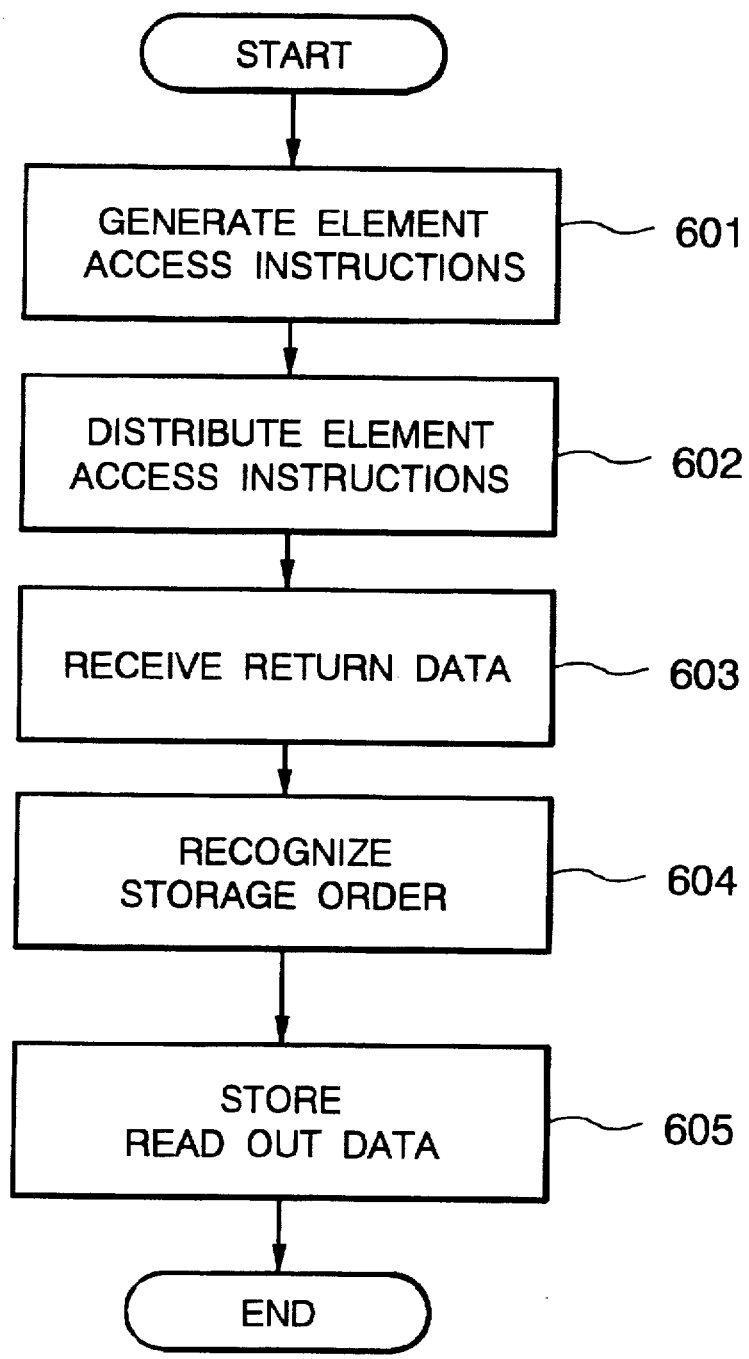
FIG. 6 is a flowchart explaining a flow of process in the information processing portion in the data transfer process in the preferred embodiment of the data transfer system of the invention.
Figure 7:
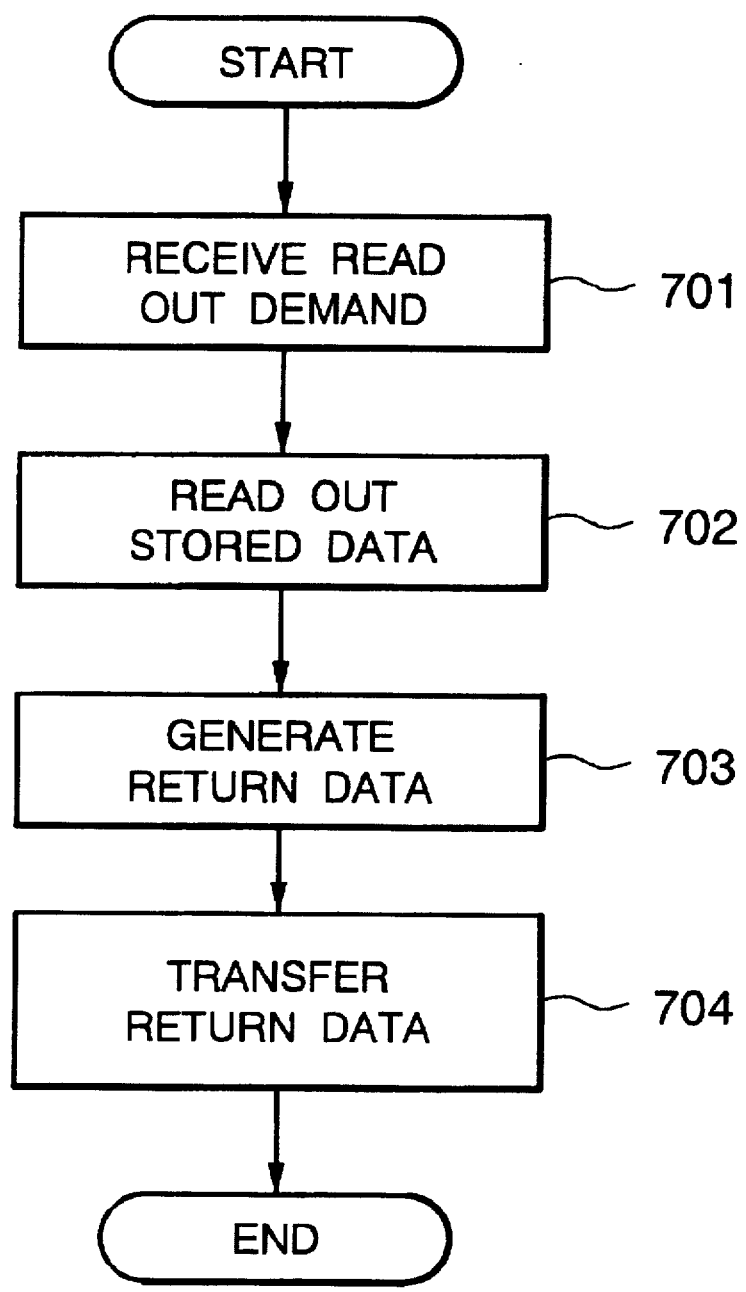
FIG. 7 is a flowchart explaining flow of process in the storage device in the data transfer process in the preferred embodiment of the data transfer process in the present invention.

In the arbitrary one of the information processing portions 70a to 70n, the vector instruction 120 for the main internal memory 10 is divided into a plurality of, namely i in number of element access instructions 130(0) to 130(i−1) corresponding to number of respective element data, and the element access instructions are thus issued (step 601 of FIG. 6).

The element access instructions 103(0) to 130 (i−1) are distributed to respective storage devices 30a to 3On respectively having corresponding addresses on the basis of the memory addresses AD contained in the instructions (step 602).

The storage devices 30a to 30n receive element access instructions 130(0) to 130(i−1) from respective information processing portions 70a to 70n. The storage devices 30a to 30n verify that the instruction kind RQ as a part of the element access instructions 130(0) to 130(i−1) is the read out instruction of the element data stored in the memory 208 (or write in instruction to the memory 208), and then store the element access instructions 130(0) to 130(i−1) in the element access instruction registers 201a to 201n (step 701 of FIG. 7).

The element access instructions 130 stored in the element access instruction registers 201a to 201n are selected by the selector.

When a plurality of element access instructions are received simultaneously from information processing portions 70a to 70n, namely when a plurality of element access instructions cause conflict for the memory 208, the selector 202 and the selection control portion 203 select a particular element access instruction 130 according to a preliminarily set preferential order.

When the memory address AD and instruction kind RQ, as a part of the element access instruction 130, are read in the memory access control portion 204, an accessing process (load or store) to the memory 208 is performed according to the memory address AD in the memory access control portion 204 (step 702).

When the element access instruction 130 is the store instruction, the write element data SD, as a part of the element access instruction 130, is written in the memory address AD of the memory 208 via the register 207.

When the element access instruction 120 is the load instruction, the element data designated by the memory address AD of the memory 208 is read out as read out element data RD (step 702).

The read out element data RD thus read out is combined with the issuance order E and the instruction discrimination I of the element access instruction 130 as object for processing by the multiplexer 209. By this, the return data 150, in which the issuance order E, the instruction discrimination I and the element data RD are combined is generated and output from the multiplexer 209 (step 703). Namely, by combining the additional information consisted of the instruction discrimination I and the issuance order E to the read out element data RD, the return data 150 is generated and output. The return data 150 is returned to one of the information processing portions 70a to 70n which issued the element access instruction 130 on the basis of the information processing number P, of the element access instruction 130, as an object for processing (step 704).

In the information processing portion 70a to 70n, the return data 150, returned from the storage devices 30a to 30n, is received and then stored in the data register 104a to 104n (step 603).

The return data 150 stored in the data registers 104a to 104n are selected by the selector 105. Then, the write control portion 109 performs a write process to the data buffer 110 to store the read out element data RD.

At this time, in the write control portion 109, on the basis of the instruction discrimination I included in the return data 150, recognition of the vector instruction 120, from which the element access instruction 130 reading out the read out element data RD is derived, is made. Then, the order of storage of the read out element data RD is recognized on the basis of the issuance order E included in the return data 150 (step 604). Namely, by the additional information including the instruction discrimination I and the issuance order E added to the return data, the storage position in the data buffer can be recognized.

Then, according to the recognized storage position, the read element data is stored in the data buffer 110 (step 605).

As set forth above, even when the received order of a plurality of read element data RD returning to the information processing portions 70a to 70n is disordered due to conflict of access for the same storage devices 30a to 30n, storage order of the read out data RD can be assured by the additional information.

On the other hand, in the storage devices 30a to 30n, it will take a certain period corresponding to a memory access time from reception of the element access instruction 130 to reading out of the element data RD from the memory 208. Therefore, when the element access instruction 130 is received, the additional information consisted of the issuance order E and the instruction discrimination I may be returned in advance of the returning of the read out element data RD for the period corresponding to the memory access time. By such process, it becomes possible to predict a timing at which all of the element data corresponding to the vector instruction 120 will be stored, in the information processing portions 70a to 70n.

Figure 8:
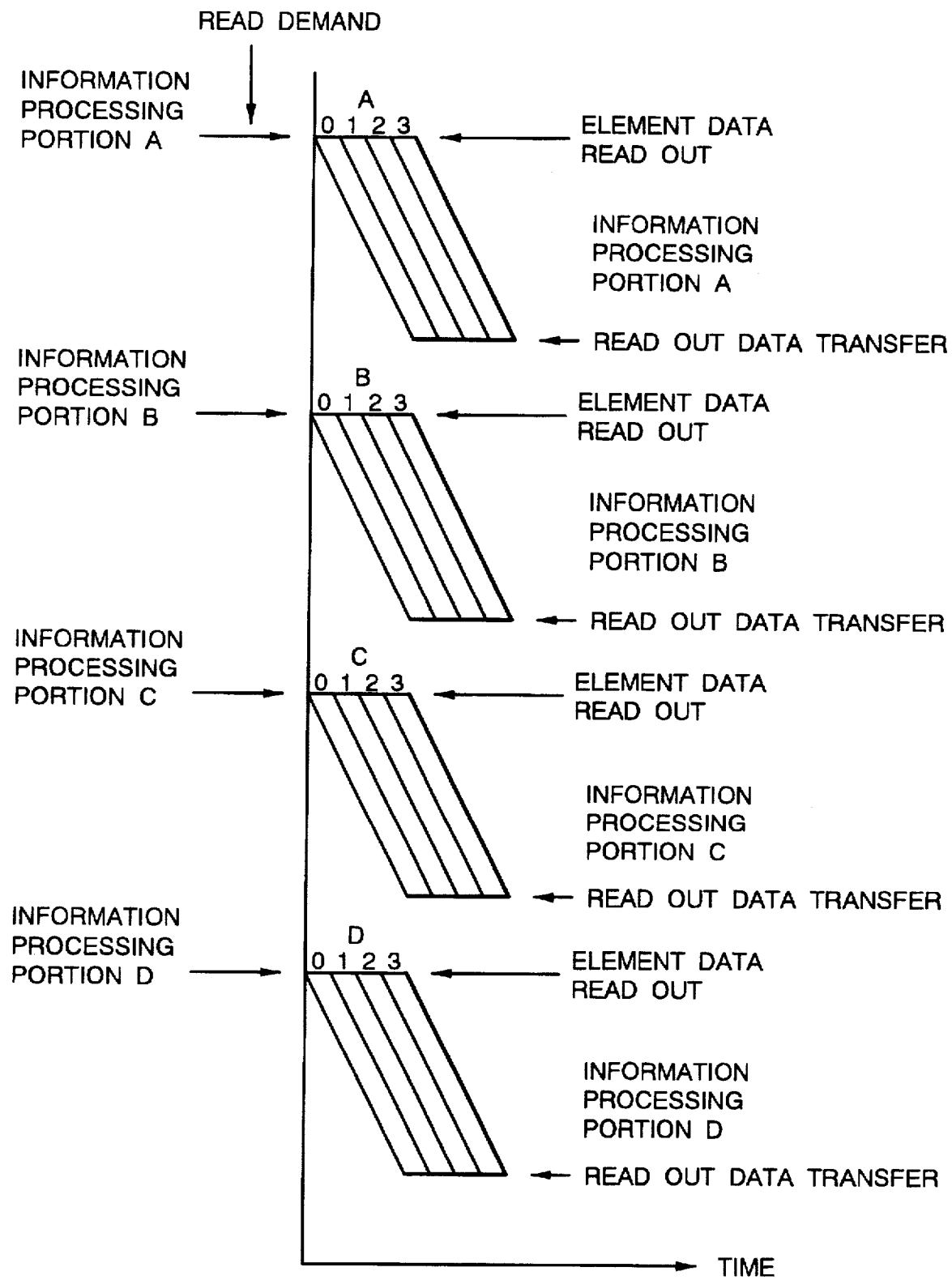
FIG. 8 is a timing chart showing operation in the case where conflict in access is caused in the present invention.

FIG. 8 is a timing chart showing the case where no conflict is caused by access of the same storage device 30a to 30n.

There is shown the operation where four information processing portions A, B, C, D issues the read out demand to the main internal memory 10 simultaneously. It is assumed that the vector length (number of vector element data) is "4" in respective information processing portions. Then, four element access instructions 0–3 are issued with respect to the vector instruction. If no conflict is cased in access of the same storage device 30a to 30n between the element access instructions issued from respective information processing portion, reading out from the information processing portions A, B, C, D is initiated simultaneously, and completed at substantially the same timing, as shown.

Figure 9:
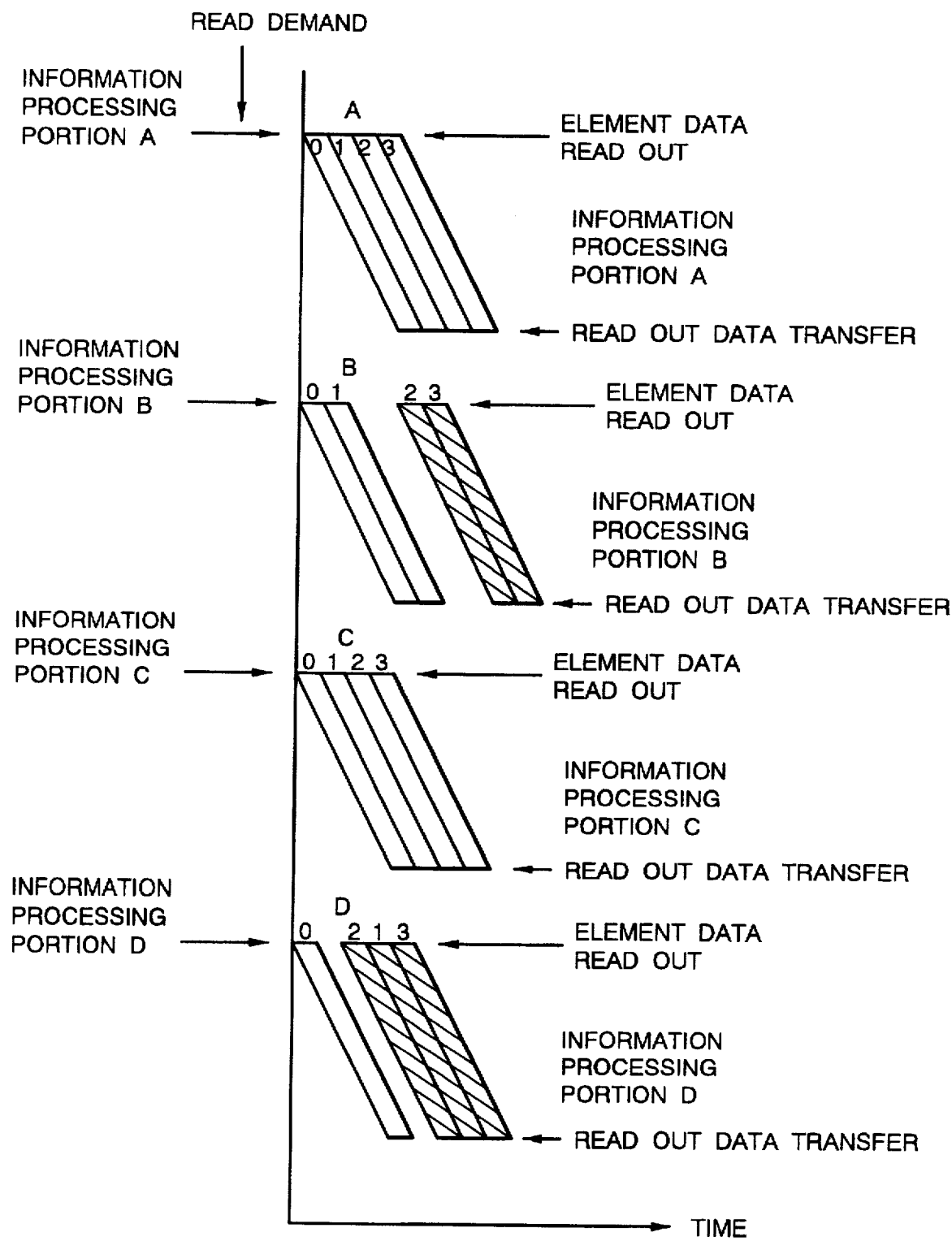
FIG. 9 is a timing chart showing operation in another case where conflict in access is caused in the present invention.
Figure 10:
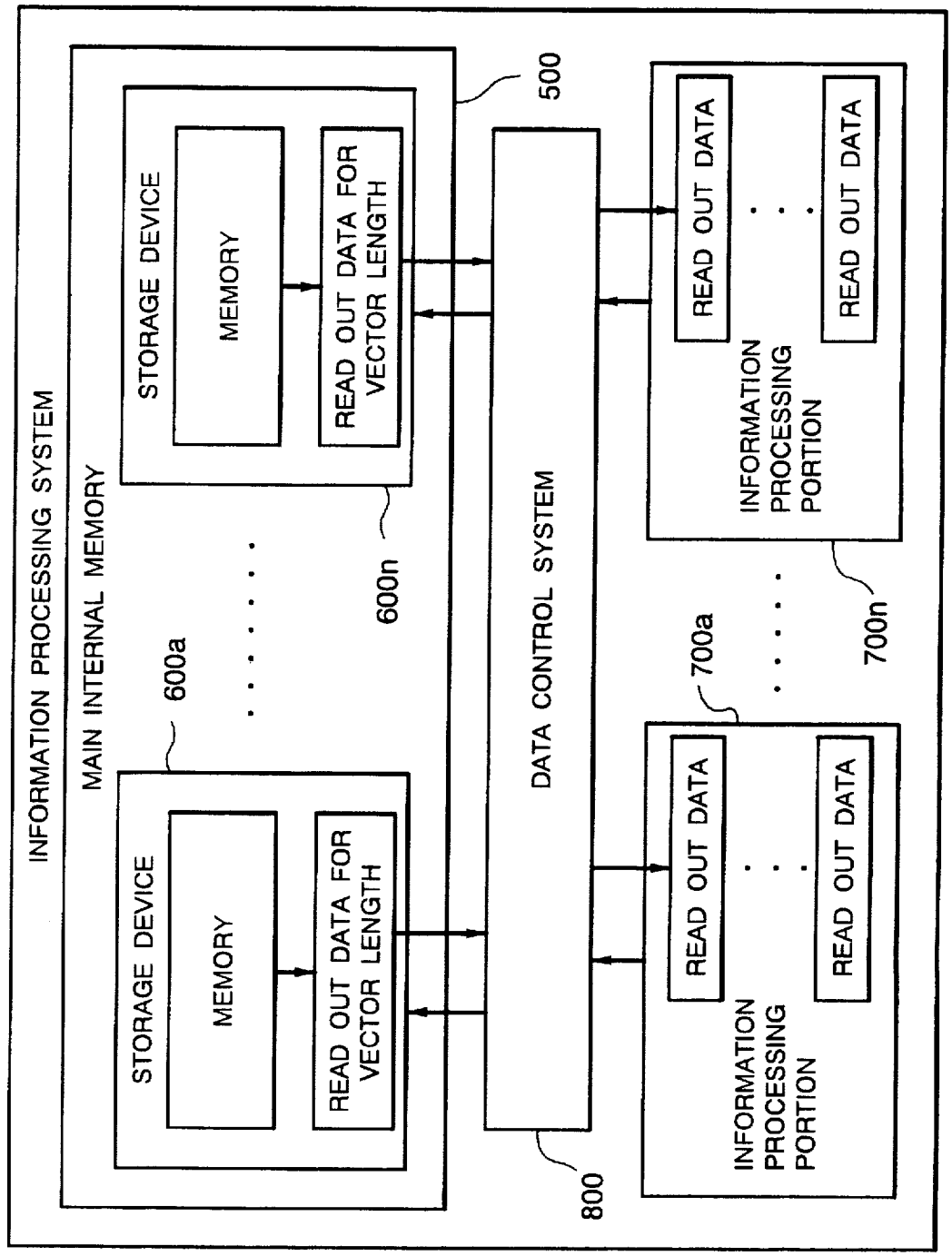
FIG. 10 is a block diagram showing the first example of the conventional data transfer system.
Figure 11:
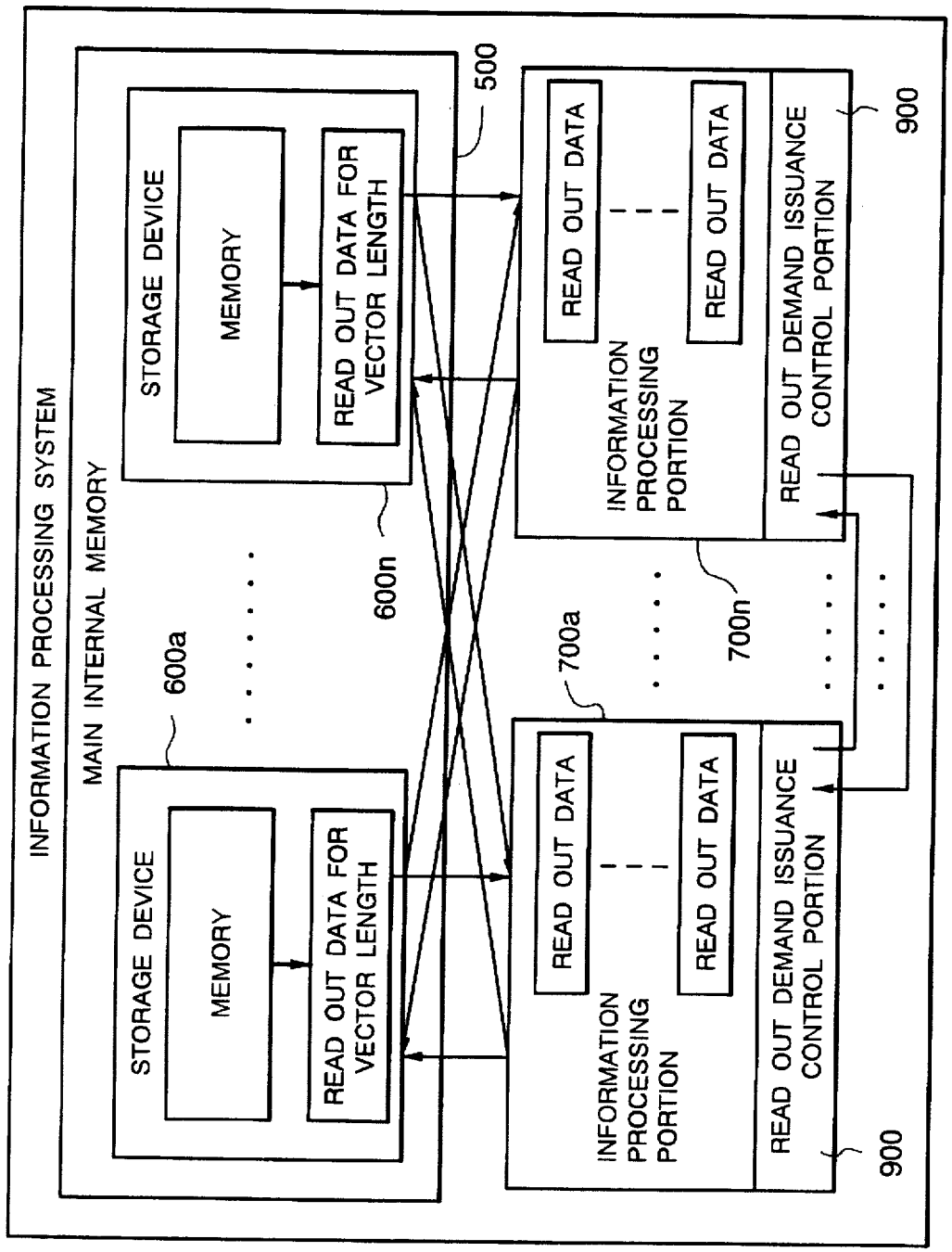
FIG. 11 is a block diagram showing the second example of the conventional data transfer system.
Figure 12:
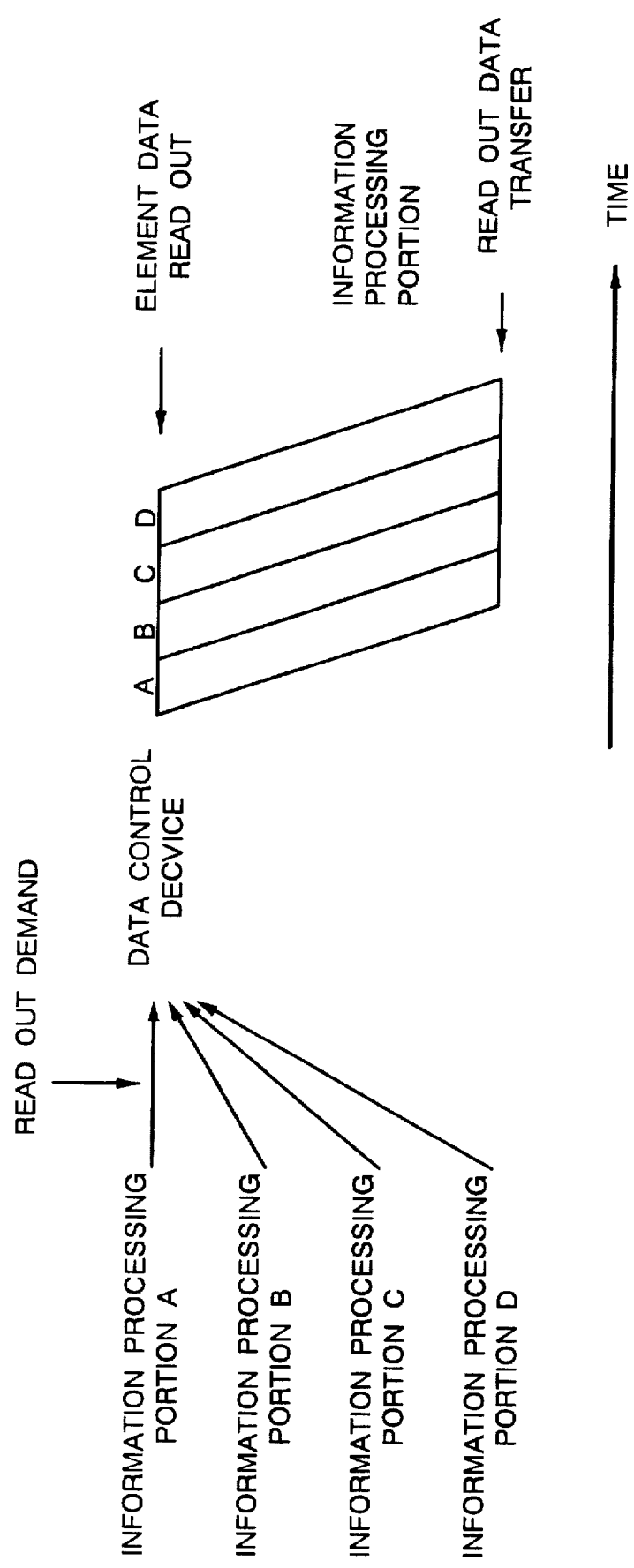
FIG. 12 is a timing chart for explaining operation in the first example of the prior art.
Figure 13:
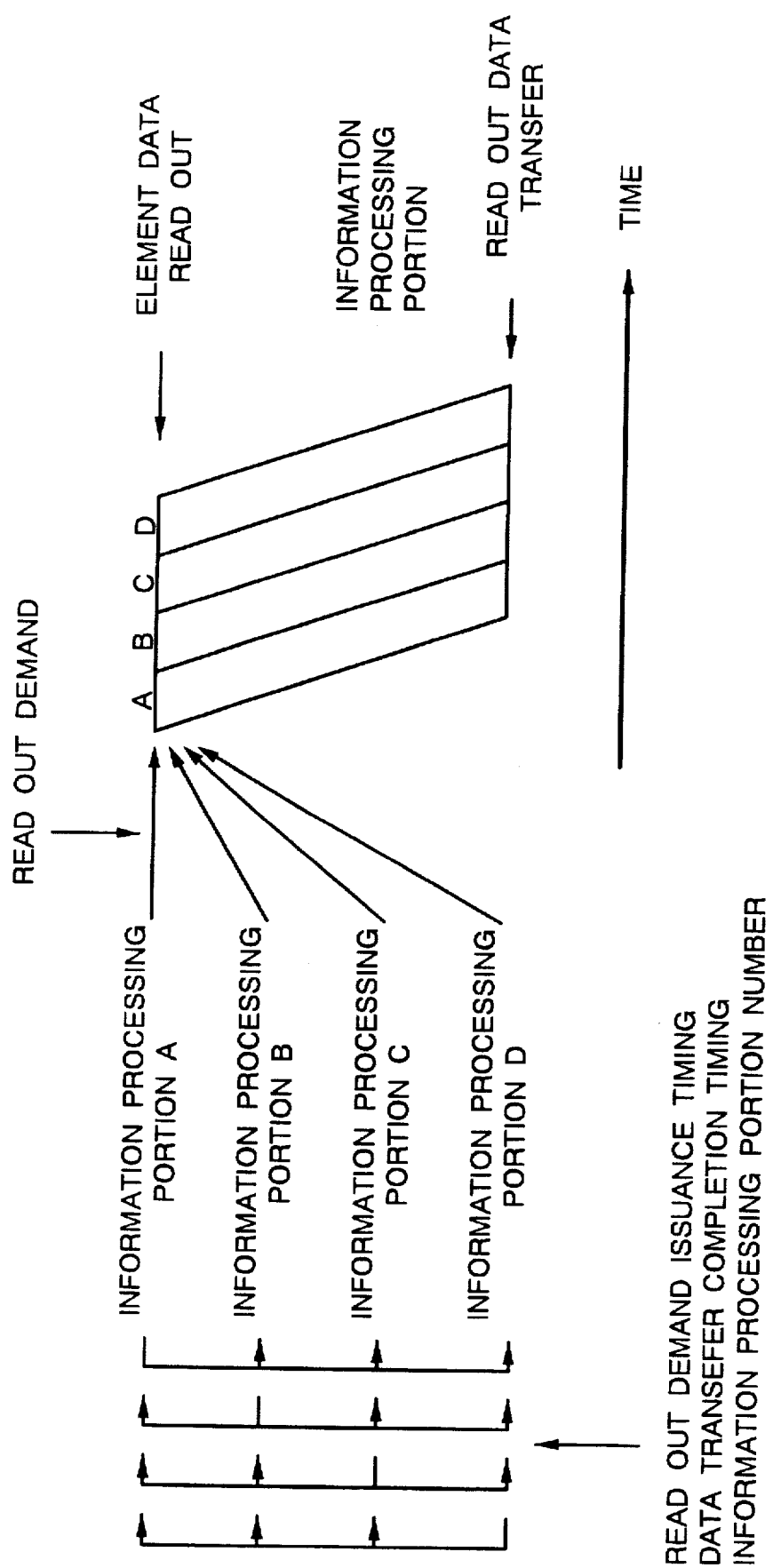
FIG. 13 is a timing chart for explaining operation in the first example of the prior art.

FIG. 9 is a timing chart showing the case where conflict is caused in accessing the same storage device 30.

There is shown the operation where four information processing portions A, B, C, D issues the read out demand to the main internal memory 10 simultaneously. It is assumed that the vector length (number of vector element data) is "4" in respective information processing portions. Then, four element access instructions 0-3 are issued with respect to the vector instruction.

In FIG. 9, conflict is caused between reading by the element access instruction as the read out demand for the element data "2" from the information processing portion A and reading by the element access instruction as the read out demand for the element "3" from the information processing portion B, since both are the instructions to access same storage device 30a to 30n. Then, the reading by the element access instruction for the element data "3" from the information processing portion B is held in waiting. Then a gap in time is caused between the element data "1" and the element data "2" to be returned to the information processing portion B.

Also, conflict is caused between reading by the element access instruction as the read out demand for the element data "1" from the information processing portion C and reading by the element access instruction as the read out demand for the element "2" from the information processing portion D, since both are the instructions to access same storage device 30a to 30n. Then, the reading by the element access instruction for the element data "2" from the information processing portion D is held in waiting. As a result, the disorder is caused between the element data "1" and the element data "2" in returning to the information processing portions D.

Thus, by taking the construction set forth above, even when the conflict is caused due to access of the same storage device, merely the period corresponding to a period required to receive the element which causes conflict in access, and simultaneous parallel data transfer becomes possible. Also, even when disorder is caused in the returned plurality of element data, the read out data can be stored in correct order by the additional information. Therefore, correct order of storage can be assured.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data transfer system including a plurality of storage means and a plurality of information processing means connected to said storage means, wherein:

each of said information processing means comprises divided instruction issuing means for dividing an original instruction for reading out a plurality of element data from said storage means into a plurality of read out demands, each read out demand corresponding solely to a respective element data, and for issuing each read out demand to said storage means in association with additional information, said additional information including data identifying said original instruction and data indicative of an order of issuance of said each read out demand; and each of said storage means comprises read out data returning means for returning a read out element data to a particular one of the information processing means which issued a received read out demand, said read out data returning means returning said additional information in association with the read out element data corresponding to said received read out demand, wherein each of said information processing means further comprises register means for storing a received read out element data, returned from said storage means in response to an issued read out demand, said register means storing the received read out element data in a correct order on the basis of said additional information received from said storage means in association with said received read out element data, and wherein each of said storage means is accessible by each of said information processing means.

2. A data transfer system as set forth in claim 1, wherein said divided instruction issuing means distributes said each read out demand to said storage means on the basis of an address of said respective element data.

3. A data transfer system as set forth in claim 1, wherein said each read out demand includes:

demand source data identifying a particular one of the information processing means as a source of the read out demand, order data indicative of an issuance order in which the read out demand was issued, discrimination data for identifying an original instruction as a dividing source of the read out demand, and memory address data for the corresponding element data in said storage means.

4. A data transfer system as set forth in claim 1, wherein said storage means returns said additional information, corresponding to the read out element data which is read out in accordance with said received read out demand, in advance of said read out element data for a period corresponding to a period required for a reading out process of said read out element data.

5. A data transfer system as set forth in claim 1, wherein said storage means includes selection control means for selecting one of a plurality of received read out demands when one of said plurality of received read out demands causes conflict with another of said plurality of received read out demands.

6. A data transfer system including a plurality of storage means and a plurality of information processing means connected to said storage means, wherein:

each of said information processing means comprises:
divided instruction issuing means for dividing an original instruction for reading out a plurality of element data from said storage means into a plurality of read out demands, each read out demand corresponding solely to a respective element data, and for issuing each read out demand to said storage means in association with additional information, said additional information including data identifying said original instruction and data indicative of an order of issuance of said each read out demand; and register means for storing received read out element data returned from said storage means, in a correct order on the basis of received additional information returned from said storage means; and each of said storage means comprises:

read out data returning means for returning a read out element data to a particular one of the information processing means which issued a received read out demand, said read out data returning means returning said additional information in association with the read out element data corresponding to said received read out demand, and wherein said divided instruction issuing means distributes said each read out demand to said storage means on the basis of an address of said respective element data, and each read out demand includes:

demand source data identifying a particular one of the information processing means as a source of the read out demand, order data indicative of an issuance order in which the read out demand was issued, discrimination data for identifying an original instruction as a dividing source of the read out demand, a memory address in said storage means of each element data, memory address data corresponding to the address of said respective element data, and wherein each of said storage means is accessible by each of said information processing means.

7. A data transfer system as set forth in claim 6, wherein said storage means returns said additional information, corresponding to the read out element data which is read out in accordance with said received read out demand, in advance of said read out element data for a period corresponding to a period required for a reading out process of said read out element data.

8. A data transfer system as set forth in claim 6, wherein said storage means includes selection control means for selecting one of a plurality of received read out demands when one of said plurality of received read out demands causes conflict with another of said plurality of received read out demands.

9. A method for transferring data, in an information processing system including a plurality of storage means and a plurality of information processing means connected to said storage means, said method comprising the steps of:

in one of said information processing means:

(a) dividing an original instruction for reading out a plurality of element data from said plurality of storage means into a plurality of read out demands, each read out demand corresponding solely to a respective element data;

(b) issuing said each read out demand to corresponding ones of said storage means in association with additional information, said additional information including data identifying said original instruction and data indicative of an order of issuance of said each read out demand;

in at least one of said storage means:

(c) receiving a read out demand and said associated additional information, issued in step (b) from said one of said information processing means;

(d) returning a read out element data to said one of said information processing means which issued the received read out demand;

(e) returning said received additional information to said one of said information processing means, said returned additional information being returned in association with the read out element data returned in step (d); and in said one of said information processing means:

(f) storing the read out element data returned from said at least one of said storage means in step (d), in a correct order on the basis of said additional information returned from said at least one of said storage means in step (e).

10. A data transfer method in an information processing system as set forth in claim 9, wherein, in step (b), said each read out is distributed to a corresponding one of said storage means on the basis of an address of the respective element data.

11. A data transfer method in an information processing system as set forth in claim 9, wherein said step (f) is performed in advance of said step (e) for a period corresponding to a period required for a reading out process of said read out element data.

* * * * *